United States Patent [19]

Ruechel

[11] Patent Number: 4,493,345
[45] Date of Patent: Jan. 15, 1985

[54] THERMAL INSULATION JACKET HAVING CURVED TUBE OR PIPE

[75] Inventor: Frank Ruechel, Ladenburg, Fed. Rep. of Germany

[73] Assignee: Isover Saint-Gobain, Neuilly-sur-Seine, France

[21] Appl. No.: 516,092

[22] Filed: Jul. 22, 1983

Related U.S. Application Data

[63] Continuation of Ser. No. 255,338, Apr. 17, 1981, abandoned.

[30] Foreign Application Priority Data

Apr. 18, 1980 [DE] Fed. Rep. of Germany ....... 3015013

[51] Int. Cl.³ .............................................. F16L 59/02
[52] U.S. Cl. ...................................... 138/178; 138/151
[58] Field of Search ............... 138/100, 101, 103, 140, 138/149, 151, 157, 178, DIG. 8, DIG. 11; 174/11 R, 110 F, 136; 285/47, 180, 182; 428/36

[56] References Cited

U.S. PATENT DOCUMENTS 847,049 3/1907 Embury ............................. 285/182
3,289,702 12/1966 Sherburne ....................... 138/157 X

FOREIGN PATENT DOCUMENTS 0082489 2/1919 Switzerland ........................... 154/45

Primary Examiner—Stephen Marcus
Assistant Examiner—Mark Thronson
Attorney, Agent, or Firm—Pennie & Edmonds

[57] ABSTRACT

A thermal insulation jacket for a curved tube as two shell halves such that the shape of each shell half has portions which enclasp the tube and afford at least a temporary attachment to the tube without additional manual or other external support. Thus, one person may easily install insulation jackets made in accordance with this invention because the shell halves, upon being placed on the curved tube, will stay in position on the tube while they are being tied or otherwise permanently secured to the tube or to each other.

1 Claim, 4 Drawing Figures

THERMAL INSULATION JACKET HAVING CURVED TUBE OR PIPE

This application is a continuation of application Ser. No. 255,338 filed Apr. 17, 1981.

FIELD OF THE INVENTION

The invention relates to a thermal insulation jacket for a curved tube or pipe such as a plumbing elbow.

DESCRIPTION OF THE PRIOR ART

A thermal insulation jacket for this purpose is known. See, for example, German Utility Model Patent No. 72 36 452, which provides thermal insulation for a curved tube in the form of complementary shell-shaped arcs of the insulating material. In the German Utility Model Patent No. 72 36 452, the partitioning of shell-shaped arcs is in the plane of curvature of the central axis of the tube so that homologously equal upper and lower shell halves are formed. Upon placing these halves against a curved tube from opposite sides, they combine with each other to form an insulating jacket having a full circular cross section. It has also been suggested that an arcuate thermal insulation jacket for a curved tube may be formed in two parts such that they are partitioned along a cylindrical surface of which the center line of the tube is an element and the central axis of the surface is perpendicular to the plane of curvature of the tube and passes through the center of curvature of the tube. This suggestion is made in German Utility Model Patent No. 72 36 452 and such an insulation jacket is illustrated in German Utility Model Patent No. 78 30 252. This latter form does not provide two equally developed and interchangeable shell halves as does the former; rather it provides one smaller inside shell and a larger outside shell. It can be said, however, that the latter form results in a better closure of the separation between the shells when they are tied or otherwise fastened onto a curved tube.

Insulation jackets having either of these known forms described above are difficult to mount on a curved pipe or tube because at least one of the shells, and in unfavorable circumstances both shells, must be held in position against the pipe or tube while being tied on. In short, installing such installation shells is a job requiring three hands—one to hold the insulation shells in place and two to tie—so that installation cannot be done by one person.

BRIEF DESCRIPTION OF THE INVENTION

In contrast to the prior art, the present invention forms a thermal insulation jacket for a curved tube as two shell halves or portions such that the shape of each shell half has portions which enclasp the tube and afford at least a temporary attachment to the tube without additional manual or other external support. Thus, one person may easily install insulation jackets made in accordance with this invention because the shell halves, upon being placed on the curved tube, will stay in position on the tube while they are being tied or otherwise permanently secured to the tube or to each other.

According to the present invention, each of two complementary shell halves of a thermal insulating jacket for a curved tube is formed in such a way that at least one portion along the curved length of the shell half will enclose more than a semi-circle, that is 180°, but less than the entire circumference of the tube on which the jacket is to be mounted. The natural resilience of the jacket material permits each shell half so formed to be sprung open at this portion and placed over the tube, whereupon the same resilience will cause the shell half to close and enclasp the tube. At the corresponding portion along the curved length of the other and complementary shell half the shell half is formed to extend less than 180° about the periphery of the tube on which it is to be installed. Together the complementary shell halves are proportioned so as to mate with each other such that they will form a full annular cross section along the entire length of the jacket and thereby completely enclose a curved tube of a given diameter. An advantage of the present invention is that the shell halves may be formed without regard to the positions of the mating surfaces of the two halves relative to the plane of curvature of the tube to which they are to be applied.

In specific embodiments of the invention to be described, there are especially advantageous placements of the partitioning or mating surfaces of the shell halves which may be formed by simple production techniques.

Further details, characteristics and advantages of the invention will be apparent from the following description of specific embodiments in which reference is made to the accompanying drawing.

Figure 1:
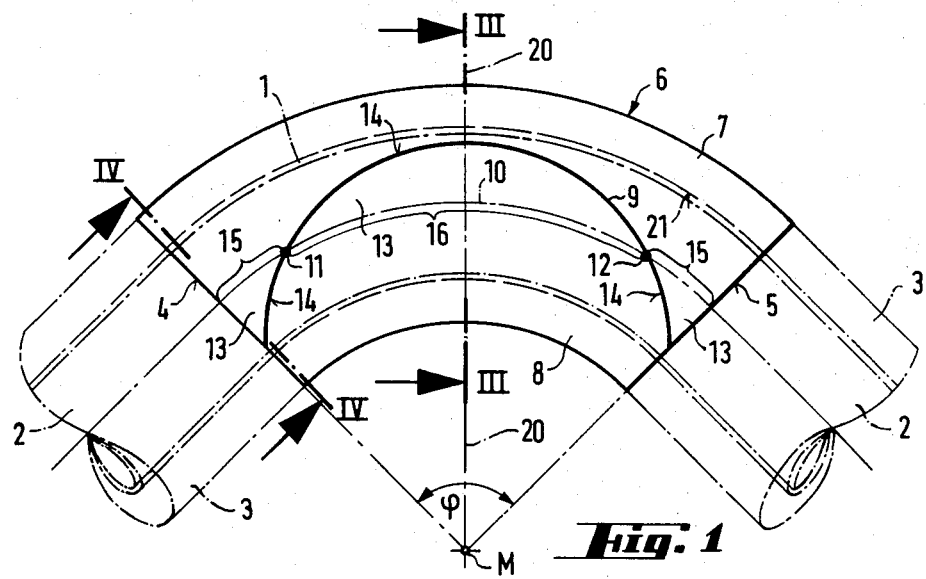
FIG. 1 is a top view of a thermal insulation jacket according to the invention with the partitioning surfaces of the complementary shell halves lying perpendicularly to the plane of curvature of the central axis of a curved tube in which the partitioning surfaces each form a portion of a circular cylinder having a radius which is smaller than the radius of curvature of the curved tube.

In the drawing, the number 1 designates a curved tube shown in broken line. As shown, curved tube 1 interconnects two straight sections 2 and 2' of tube, also shown in broken line. Here the tubes 2 and 2' are shown interconnected at a right angle but the invention is not so limited. The straight tube sections 2 and 2' are insulated against loss of heat, in a manner known per se, by thermal insulation jackets 3 and 3' which abut end surfaces 4 and 5 of a thermal insulation jacket 6 for the curved tube 1. The thermal insulation jacket 6 has the same radius of curvature as that of the tube 1 and consists of two complementary shell halves or portions 7 and 8 which, as shown, mate and register with each other along the partitioning surfaces 9. In this embodiment the partitioning surface 9 of each shell half is a portion of a right cylinder having a radius which is smaller than the radius of curvature of the jacket 6 and the central axis of which is perpendicular to the plane of curvature of the jacket 6 and the tube 1. The partitioning surface 9 intersects the central axis 10 of the curved tube 1 and of jacket 6 at two points 11 and 12 which are inwardly along the central axis from the end faces 4 and 5 of the jacket such that the shell halves 7 and 8, respectively, have projective regions 13 and recessive regions 14 which interfit in such a way that at each cross section along the length of the curved tube a full annulus of thermal insulation material is formed by the thermal insulation jacket 6.

Figure 3:
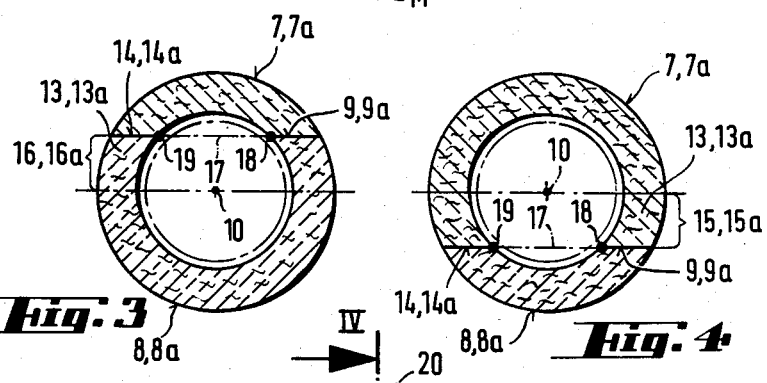
FIG. 3 shows a cross sectional view along the line III—III of the jackets of FIG. 1 and 2.
Figure 4:
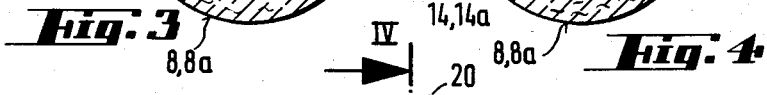
FIG. 4 shows a cross sectional view along the line IV—IV of the jackets in FIGS. 1 and 2.

As is best seen in FIGS. 3 and 4, each of the shell halves 7 and 8 has an inner recess in the projective region 13 associated with it such that the shell half 7 or 8 extends over the periphery of the curved tube by more than 180°. The places of maximum extension of the shell half 7 of the embodiment of FIG. 1 are illustrated by FIG. 4 and the place of maximum extension of the shell half 8 is illustrated by FIG. 3. According to the invention it is characteristic of the place of maximum extension of a shell half, such as 7 or 8, that an imaginary straight line, designated 17, through two points 18 and 19 will be radially displaced from the central axis 10 of the curved tube 1 which is also the central axis of the insulation jacket 6. The points 18 and 19 are defined by the intersections of the partitioning surface 9 of each shell half with the inner periphery of insulating jacket 6 at the designated cross section. As is clear from FIGS. 3 and 4, the condition that the straight line 17 does not pass through the central axis 10 of the curved tube is fulfilled even if each of the partitioning surfaces 9 are dissolved, in a manner not shown in detail, into two partial surfaces which lie in different relative positions to the central axis 10 of the curved tube, whereby the partitioning surface may lie on one side, say in the plane of symmetry of the thermal insulating jacket 6 and deviates from the latter plane only on the opposite side. Also the orientation of the direction of the partitioning surface of each shell half radially outside of the points 18 and 19 is obviously without significance and may be varied as required in each individual case.

The thermal insulation jacket 6 may be made for example as an injection molded part from polyurethane hard foam or some similar material. The thermal insulation jacket may also be readily formed as a pressed or molded part to achieve more complicated shaping. The shell halves 7 and 8 may also be prefabricated as separate molded parts which permits great freedom in the position of the partitioning surfaces at each side of the curve. In the alternative, one may fabricate a unitary thermal insulation jacket 6 in full annular cross section and then partition the jacket into the two shell halves 7 and 8 by any suitable means to achieve the desired course of the partitioning surfaces 9 according to the invention. The latter alternative is particularly well adapted for making curved insulation jackets which are built up in a known manner from separate linear segments having a polygonal cross section. Such segments are made from a mineral fiber material and are sufficiently flexible that although initially straight they may be assembled into a curved tubular form suitable for insulation jackets such as are used in the present invention. After the curved jacket is built by this means, it is cut along the partitioning surfaces 9. The position of the partitioning surfaces 9 illustrated in FIG. 1 is particularly well suited for this, since the partitioning surface 9 lay in the generated surfaces of a circular cylinder and may easily be produced with the use of a simple cutting tool.

Advantageously, and without regard to the particular production process, the arrangement of the projective regions 13 and of the recessive regions 14 is made such that between one side of the plane 20, which is perpendicular to the plane of curvature and bisects the arch-angle, designated by $\phi$, of the extent of curvature of the central axis 10 about the center of curvature, designated by M, and a 45° plane perpendicular to the plane of curvature, there always results at least one lateral bearing area 15 or 16 for the shell halves 7 and 8. In this way a symmetry in relation to plane 20 will be achieved, so that both shell halves 7 and 8 are neatly symmetrically supported and do not bear more heavily on one side or the other. In the embodiment according to FIG. 1, this has been achieved by the fact that the bearing area 16 for the inner shell half 8 projects at both sides beyond the angle-bisecting plane 20 and by the bearing areas 15 for the outside shell half 7 being provided in symmetry to the plane 20 in the area of the two end surfaces 4 and 5. In this respect, the central axis of the imaginary circular cylinder which defines the partitioning surface 9 lies in the angle-bisecting plane 20 in a region between the center of curvature M and the central axis 10, whereby the position of the axis of the imaginary cylinder on the one hand and the radius of the partitioning surfaces are selected such that, depending on the material used for the thermal insulating jacket 6, it is possible to bend the projective regions 13 of a shell half sufficiently far apart without damage to permit the shell half to be applied over the curved tube 1, following which the projective regions return by the natural resilience of the jacket material to their stable positions where they reach far enough over the tube 1 to enclasp it between them. This provides a simple and effective means for holding the shell half on the tube while the other mating shell half is applied and both of them will remain in place on the tube without other external support. This leaves both hands of the installer free to apply the ties or other means of securing the insulation jacket to the tube. Of course, the projective regions 13 should not extend about the tube by as much as 360°, because a lateral joining of the shell halves on the curved tube is no longer possible. However, in the case of a highly resilient and easily bendable material the angle through which the bearing areas 15 and 16 of the projective regions 13 extend may be as much as, or even in excess of, 300°.

Figure 2:
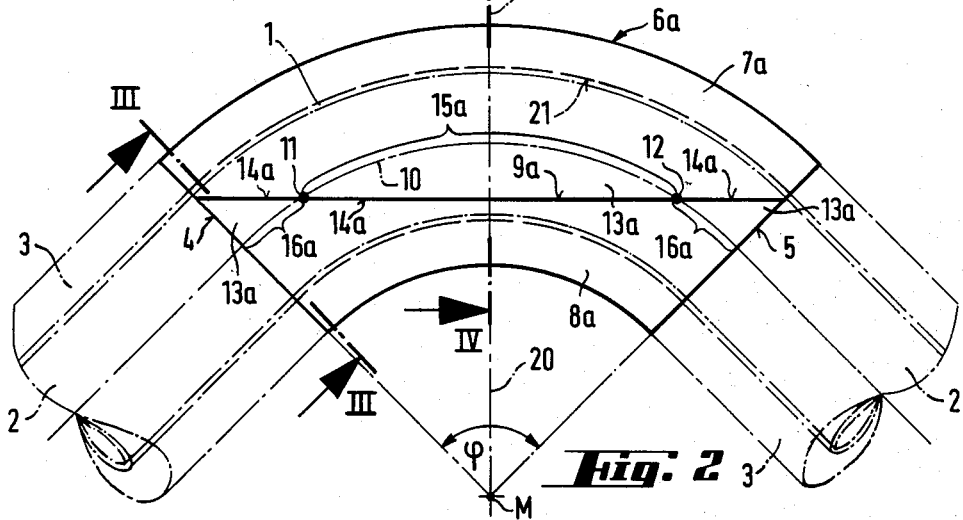
FIG. 2 shows a top view similar to FIG. 1 of a modified embodiment wherein the partitioning surfaces of the complementary shell halves extend along a plane which may be perpendicular to the plane of curvature of the tube.

In the embodiment illustrated in FIG. 2, to which FIGS. 3 and 4 also apply, the corresponding parts have been given the same reference numbers as in FIG. 1, but with the suffix "a", so that the structure is readily understood in view of the preceding explanations of FIG. 1.

The embodiment of FIG. 2 differs from that of FIG. 1 merely by the fact that the radius of the imaginary circular cylinder in which the partitioning surfaces 9a lay is larger than the radius of curvature of the central axis 10 of the tube 1. Therefore, the central axis of the imaginary cylinder may lie, as before, in the angle-bisecting plane 20, but on the side of the center of curvature M opposite the central axis 10. In this embodiment, the axis of the imaginary cylinder has been positioned, i.e., moved so far down in the drawing, at an infinite distance such that the surface of the imaginary cylinder degenerates into a plane. Therefore, each partitioning surface 9a is a plane which may be produced by a straight cut which, from the point of view of a production technique, is particularly simple and results in forming two shell halves which mate and register with each other along their partitioning surfaces. Such a straight cut will be possible in many current sizes of thermal insulation jackets 6a and only assumes that the plane partitioning surface 9a, as seen from above as in FIG. 2, will remain between the two broken lines which represent the inside periphery 21 of the thermal insulating jacket 6a. In case of curved tubes having shorter radii of curvatures and which do not extend through more than 90°, and/or in case of a large radius and a relatively thin walled insulation jacket, an embodiment may also be selected such that the center of the imaginary circular cylinder, in which defines the partitioning surface lies may be located on the side of the central axis 10 opposite the center M of curvature, so that the partitioning surface 9a is curved in counter direction to each central axis 10. By this means one may obtain sufficiently large projective regions 13a.

In every case according to FIG. 1, wherein the imaginary cylinder axis lies between the center of curvature M and the central axis 10, lateral bearing areas 15 for the outside shell half 7 are located adjacent the end surfaces 4 and 5. In the case of FIG. 2, wherein the axis of the imaginary cylinder lies outside of the region between the center of curvature M and the central axis 10, the lateral bearing areas 16a for the inside shell half 8a occur in the regions of the end surfaces 4 and 5.

Naturally, it is not necessary for the partitioning surfaces 9 or 9a to have a circular cylindrical shape or the degenerate planar shape; obviously an eliptical cylindrical form or some other deviation from a circular cylinder will achieve the same effect and may be more advantageous. Nevertheless, the circular cylindrical form of FIG. 1 and especially the planar form of FIG. 2 may be produced particularly easily by first forming a unitary, curved insulation jacket and then cutting it to produce the shell halves 7 and 8 or 7a and 8a. Furthermore, the invention is not necessarily limited to use in thermal insulating jackets 6 and 6a for curved tubes, but may also be used in thermal insulation jackets such as 3 for straight tubes or pipes, if in an individual case a need arises for it. Of course, a planar partitioning surface between shell halves for straight tubes will not provide the benefits of the invention; rather one must make the partitioning surface undulate from one side to the other of a plane through the central axis of a straight tube.

What is claimed is:

1. A jacket having a central axis and two opposite end surfaces with said jacket being formed of a thermal insulating material defined by two shell portions which interfit and register along individual partitioning surfaces to provide a complete thermal insulation enclosure, said jacket having a curved outline along a plane of curvature and adapted to be received on a tube having a similarly curved outline and an axis both located in said plane of curvature and substantially coincident with the central axis of said jacket wherein said partitioning surfaces of each shell portion extend toward said tube in a direction substantially perpendicular to said plane of curvature and follow a path from one end surface of said jacket to the other end surface to intersect said coincident axes at two locations thereby to define at least one region in each shell portion which extends around the periphery of said tube throughout a distance greater than 180° and wherein the partitioning surface of each shell portion is defined by the surface of a circular cylinder in which the radius is greater than the radius of curvature of said tube and is substantially infinite such that each partitioning surface defined thereby is substantially planar.

* * * * *